UNITED STATES PATENT OFFICE.

ALEXANDER K. SEDGWICK, OF CHICAGO, ILLINOIS.

PROCESS OF EXTRACTING SULPHUR.

1,406,905.  Specification of Letters Patent. Patented Feb. 14, 1922.

No Drawing.    Application filed January 26, 1921.  Serial No. 440,178.

*To all whom it may concern:*

Be it known that I, ALEXANDER K. SEDGWICK, a citizen of the United States, residing at Chicago, in the county of Cook and State of Illinois, have invented or discovered certain new and useful Improvements in Processes of Extracting Sulphur, of which the following is a specification.

This invention relates to the extraction of sulphur from its ores, or more particularly the separation of native sulphur from the rock or earthy substance with which it is usually mixed.

The objects of this invention are to provide a simple and efficient method of extracting sulphur from its ore; to provide a method of recovering sulphur whereby the sulphur may be separated from earthy material without being heated above the melting point; to remove earthy material from a mass of molten sulphur by means of oil together with air or steam or both; and to provide such improvements in sulphur recovery as will be described more fully hereinafter.

There are large deposits of native sulphur mixed with volcanic ash or other earthy material in which there is a comparatively small percentage of sulphur. The methods which have been suggested for recovering such sulphur usually contemplate the removal of the sulphur from the rock or ore. Instead of proceeding in this manner my improved method may be said to provide for removing the ore or earthy material from the sulphur. In order to do this I provide a mother bath of liquid or molten sulphur in any suitable receptacle, but preferably one having sufficient depth so as to permit the separating action. This bath may be said to serve as the particular separating medium and is preferably maintained at about 155 degrees C. or at its most fluid temperature.

The ore is then introduced gradually into this bath and the whole mass is then subjected to agitation with a small amount of oil, which brings the earthy material into intimate contact with such oil, and which agitation also aerates the mixture to some extent. In some cases water is added to the mixture to facilitate the forming of a froth. This froth will carry the particles of earthy matter or rock to the top of the bath from which they can then be removed in any suitable manner, as by skimming or the like.

While the above furnishes a general description of the process, I prefer to preheat the mass of ore and grind so as to pass through a 60 mesh sieve. This ground and preheated ore is introduced through any suitable pipe to the bottom portion of the bath so that the ground rock or earthy material will have to be carried up through the bath. The oil is also preferably introduced through any suitable pipe to the bottom of the bath at the same time as the steam or hot air is introduced and should enter the mass at about the same temperature as the molten sulphur. The earthy material after agitation rises to the surface as a scum or froth and is removed from the top of the bath, while the liquid sulphur may be removed from the bottom of the bath from time to time through any suitable outlet. Any suitable oil, such as whale or fish oil may be used, the sulphur being practically insoluble in this type of oil, though other animal, vegetable or insoluble oils may be used.

What I claim is;

1. A method of recovering sulphur from its ore, which consists in providing a bath of sulphur and then introducing the sulphur ore and oil into said bath and mixing the same whereby the solid particles will be carried to the top of the bath.

2. The method of recovering sulphur from its ores, which consists in providing a bath of molten sulphur, then introducing the ore into the bath in a heated condition, adding oil to the bath, agitating the mixture and removing the earthy material which rises to the surface of the bath.

3. The process of extracting sulphur, which consists in providing a bath of molten sulphur, then introducing the ground ore in a heated condition into the bottom of the bath and then introducing oil and a gaseous medium into the bottom of the bath and mixing the same so that the earthy material will rise to the surface of the bath.

4. The method of extracting sulphur from its ore, which consists in separating sulphur ore in a bath of molten sulphur, by introducing an oil or the like into the mixture, agitating the mixture to form a scum or froth compound of earthy materials, which rises to the surface, and removing the sulphur from the bottom of the bath.

5. The method of separating the sulphur from the earthy materials in a mixed ore, which consists in preheating and grinding the ore, then introducing it into a bath of molten sulphur, then introducing an oily substance, and then subjecting the mass to agitation to mix the ingredients thereof to cause the earthy materials to rise to the surface from which it is removed.

6. The method of separating the sulphur from the earthy materials in a sulphur bearing ore, which consists in preheating and grinding the sulphur bearing ore, then introducing said heated and ground ore into the bottom of a bath of molten sulphur, then introducing an oily substance with a gaseous medium into the bottom of said bath and mixing the same to cause the earthy materials to rise to the surface of the bath from which they may be removed, and then removing the sulphur from the bottom of said bath.

ALEXANDER K. SEDGWICK.